March 6, 1962  R. FRIEDMAN  3,023,573
ROCKET MOTOR WITH FUEL EXTRUSION MEANS
Filed March 23, 1959  2 Sheets-Sheet 1

INVENTOR
Raymond Friedman
BY Martha L. Ross
AGENT

March 6, 1962  R. FRIEDMAN  3,023,573
ROCKET MOTOR WITH FUEL EXTRUSION MEANS
Filed March 23, 1959  2 Sheets-Sheet 2
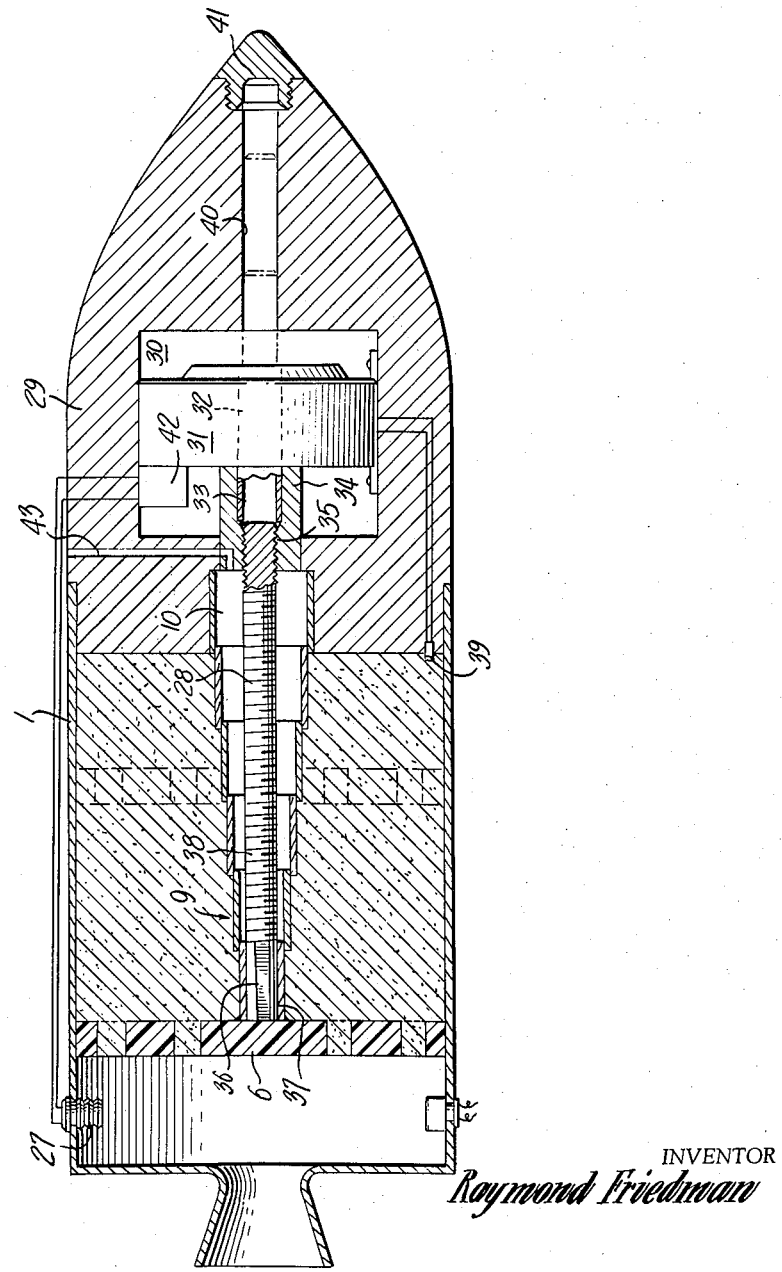
INVENTOR
Raymond Friedman
BY Martha L. Ross
AGENT United States Patent Office 3,023,573
Patented Mar. 6, 1962

3,023,573
ROCKET MOTOR WITH FUEL EXTRUSION MEANS
Raymond Friedman, Alexandria, Va., assignor to Atlantic Research Corporation, Alexandria, Va., a corporation of Virginia
Filed Mar. 23, 1959, Ser. No. 801,393
17 Claims. (Cl. 60—35.6)

This invention relates to apparatus for generating gases by the combustion of a plastic, extrudable monopropellant, for such purposes as producing thrust, power, heat energy or gas pressure.

One of the objects of the invention is to feed monopropellant extrusively from a storage chamber into an adjacent combustion chamber responsive to variations in the combustion chamber pressure, without the employment of pressurizing devices located externally of said chambers for forcing the monopropellant into the combustion chamber against combustion chamber pressure, and for controlling the rate of extrusion to maintain the desired combustion chamber pressure.

Another object of the invention is the provision of a storage reservoir for the mass of monopropellant, and an adjacent combustion chamber, with an extrusion plate therebetween in which the latter functions as a differential piston in applying extrusion pressure to the mass. This is a reversal of the functional practice of extrusion in which the pressuring means moves the entire mass toward the extrusion plate with the concomitant disadvantage of creating differences in the rate of flow from the center to the periphery of the mass due to friction between the moving mass and the walls of the storage reservoir.

A further object of the invention is the provision in apparatus as described, of an extrusion plate made of a low thermal conductivity material which, preferably, also gasifies at combustion chamber temperatures thereby inhibiting any tendency of the extruding monopropellant mass to burn back along the walls of the orifices in the extrusion plate into the mass in the storage chamber.

Other objects of the invention will appear as the following description of a practical embodiment of the invention proceeds, a rocket motor having been used for purpose of illustration.

In the drawings which accompany and form a part of the following specification, like parts in the several figures are identified by the same reference character, FIGURE 1 is the side and sectional view of a rocket motor taken in a diametrical plane showing the storage reservoir in position of maximum capacity, the extrusion plate being in fully extended position.

FIGURE 4 is a longitudinal section through a modified form of the invention.

Figure 1:
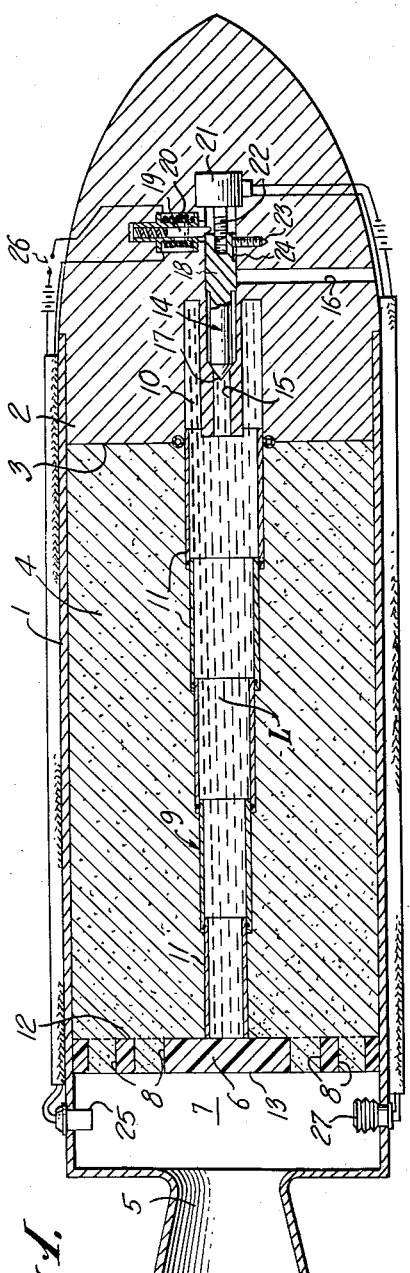
Figure 3:
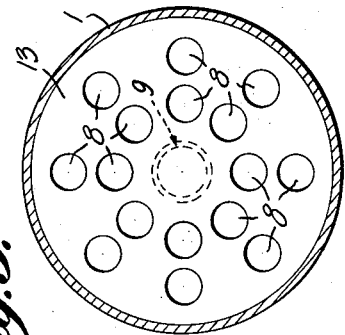
FIGURE 3 is a cross section taken along the line 3—3 of FIGURE 2.
Figure 2:
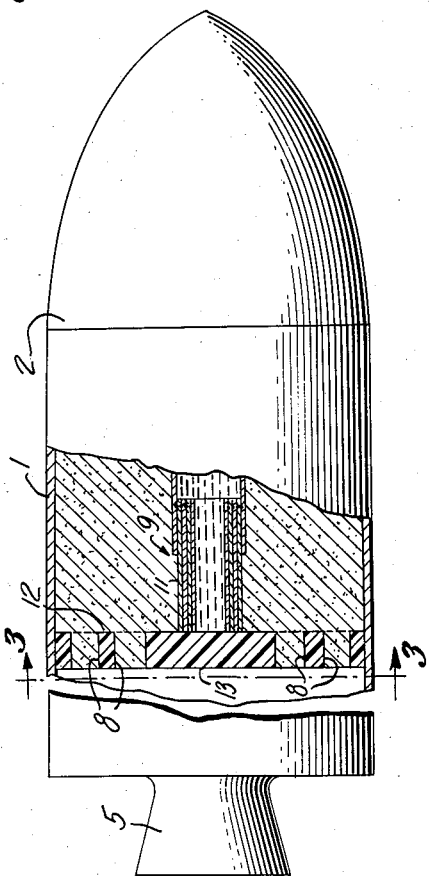
FIGURE 2 is a side view, partly in section and partly in elevation, with the intermediate part broken away, showing the extrusion plate at an intermediate position in its range of travel.

There have recently been developed for use in gas generating apparatus, such as rocket motors, gas turbines and the like, a number of plastic monopropellants, which are particularly adapted for extrusion as cohesive, shape-retaining, continuously advancing masses or columns into a combustion chamber, where they are burned to generate high energy gases for developing thrust or power or for providing heat or gas pressure. The term monopropellant refers to a composition which is substantially self-sufficient with regard to its oxidant requirements. The plastic compositions have thixotropic properties and are sufficiently fluid above a certain finite stress to be fed at ambient temperatures through shaping apertures into a combustion chamber. The leading face of the shape-retaining column presents a burning surface of predeterminable area, which can be varied and controlled by varying the rate of extrusion. These plastic monopropellants combine many of the advantages and eliminate many of the disadvantages of previously known liquid or solid propellants used to power similar devices.

Such plastic monopropellants are normally stored in a fuel tank from which they are extruded through an apertured plate or other suitable extrusion member into a combustion chamber. The primary purpose of the extrusion member is to divide the propellant into a plurality of separate masses or columns, thereby to increase the total burning area of monopropellant available in a combustion chamber of preferably minimum length.

Adverting now in detail to the drawing, the rocket motor therein illustrated comprises a cylindrical shell 1, having the cylindrical end of a member 2 fitted to its forward end, which member may be termed the payload. The member 2 has a transverse end 3 in a plane perpendicular to the axis of the shell, which forms the rear fixed wall of the monopropellant storage reservoir 4. The rearward end of the shell is provided with the vent nozzle 5.

An extrusion plate 6 within the shell forms the opposite wall 4 of the storage reservoir and the rearward wall of the combustion chamber 7. The extrusion plate is provided with a pattern of extrusion orifices 8, and functions as a piston, slidably fitting within the shell and being movable against the mass of plastic monopropellant filling the reservoir 4, developing extrusive pressure through the combustion pressure in the combustion chamber. The extrusion plate is of heat insulating material to protect the adjacent monopropellant in the storage reservoir and in the orifices from the heat of combustion developed at the surface of that face of the plate exposed to combustion chamber pressure.

The extrusion plate is provided on its upstream face 12 with a tubular stem 9, extending axially through the storage chamber, and being of such length that when said plate is in its fully extended position, namely that in which the storage reservoir has its maximum capacity, its lower end slidably fits within a well 10 in the member 2. The stem 9 is axially collapsible, being preferably made of telescoping sections 11. Telescoping the stem instead of making it in the form of a rigid one-piece tube is an advantageous expedient where the payload is relatively short and also minimizes the problem of maintaining the mobile liquid within a continuously reducing length of tube. The joints between the sections and between the outermost section and wall of the well are liquid tight.

The stem 9 defines an inner boundary wall of the propellant reservoir 4, so that the mass of propellant filling said reservoir is annular in shape. It also defines an area of the upstream face 12, which is excluded from contact with the propellant mass. The tubular stem is filled with a mobile liquid L, which is sealably confined within the stem until ignition is initiated. The liquid is preferably of low specfic gravity, such as an oil, to reduce dead weight.

During the burning cycle, pressure within the tubular stem is maintained at less than combustion chamber pressure by controlled venting of the liquid from the stem reservoir. The pressure on the central portion of the upstream face 12 of the extrusion plate within the confines of the end of section 11 of the stem 9 is thus maintained at less than combustion chamber pressure on downstream face 13, with the result that the extrusion plate is, in effect, a differential piston, biased to move forward through the mass of plastic monopropellant in the reservoir 4, producing extrusion of the monopropellant through the orifices 8.

Control of extrusion rate is achieved by controlling the rate at which the liquid is vented. Since the liquid is incompressible, the extrusion plate piston can move forward only at the rate at which the stem reservoir is depleted of liquid. The liquid venting rate can be preset for a given burning cycle or, preferably, can be made responsive to combustion chamber pressure, acceleration or velocity and, thereby, can maintain extrusion rate at the requisite value to maintain combustion chamber pressure, acceleration or velocity at the desired level.

Valve 14 controlling conduit 15, when closed, holds stem 9 filled with liquid. When said valve is open, communication is established between the column of liquid in the stem 9 and the conduit 15, the latter being open to atmosphere. By this means the column of liquid may be depleted subject to the control of the valve, permitting the extrusion plate to pressurize the mass of monopropellant in the storage reservoir and to cause extrusion of the propellant.

The valve as shown is diagrammatic. It has a needle portion 17, which engages a seat in the conduit 15, and also has a cylindrical portion 18, slidably fitting an enlarged correspondingly shaped portion of the conduit and directly controlling the discharge passage 16. The valve normally is held positively closed by means such as the wedge-shape bolt 19, which forms the armature of a solenoid 20, which normally engages the end of the valve 14 with pressure in a closing direction, and being retractable to release said valve when the solenoid is energized. The amount of opening of the valve is controlled by a regulator 21, which includes motor means for rotatively partially opening or closing said valve. The rotor of said regulator is represented by the rod 22, externally threaded at its outer end, said ends securing freely into an internally threaded axial bore in the cylindrical portion 18 of said valve. The valve is non-rotatable with respect to the conduit in which it is housed by means such as a set-screw and slot connection 23 and 24. The valve, therefore, moves in or out responsive to rotation of the rod 22, varying the rate at which liquid is depleted or dumped from the stem 9, which rate is directly proportional to the rate of extrusion of the monopropellant.

The solenoid 20 is in circuit with an igniter 25 located in the combustion chamber, and includes a switch 26, the closing of which starts the rocket motor.

The regulator 21 responds to stimuli, which may be electrical or hydraulic, communicated by a sensing device 27 located in the combustion chamber. For example, suppose that it is desired to maintain a uniform combustion pressure of 1000 p.s.i. Prior to starting the rocket motor there is no pressure (other than atmospheric) in the combustion chamber, therefore, nothing to excite the sending device. The igniter circuit is first closed. The igniter immediately ignites the monopropellant exposed in the orifices flush with the combustion chamber face of the extrusion plate, as shown, or which may have been mechanically extruded beyond said face prior to the assembling of the rocket motor. Simultaneously with the activation of the igniter the bolt 19 releases the valve so that it is free to move responsive to stimuli from the sensing device. In many instances the igniter will be a squib or other charge of such magnitude as to produce an immediate rise in pressure approximating the desired pressure of 1000 p.s.i., whereupon the sensing device will at once begin to communicate corresponding stimuli to the regulator and the valve will move in one or the other corrective direction, either partially to open the valve to bring the rate of extrusion up to that which will produce and maintain desired combustion chamber pressure, or partially to close the valve, governed by the extent to which the combustion chamber pressure produced by the igniter or by propellant factors, such as its ambient temperature, viscosity, or burning rate sensitivity to pressure, exceeds the desired pressure. In general, the rate of opening and closing of the valve will be gradual, governed by the extent to which the combustion chamber pressure at any time exceeds or falls short of the predetermined pressure, to prevent over correction or "hunting."

If the igniter is of a type that does not immediately provide an appreciable combustion chamber pressure, it may be desirable to have means in the ignition circuit operable independently of the regulator for producing a limited immediate opening movement of the valve of such magnitude as to result in an immediate rapid extrusion of monopropellant sufficient quickly to build up the desired combustion pressure.

In some applications of the invention, instead of dumping the liquid to atmosphere it may be found useful to introduce it into the combustion chamber where it vaporizes, thereby functioning as a coolant to reduce combustion chamber temperature. Such reduced temperatures are often desirable, as, for example, in gas turbines.

In the modification of the invention, illustrated by FIGURE 4, the liquid column within the stem 9 has been dispensed with and is substituted by a rigid rod 28, which extends within the stem 9 and performs all of the functions of the liquid. The rod has the advantages that it can be of substantially reduced diameter relative to that of the stem in which it is seated and of a light weight metal, such as aluminum, thereby reducing dead weight; its use avoids the necessity of making the stem liquid-tight; and its movements can be directly controlled by a motor without the intervention of a valve.

The payload 29 is provided with a recess 30 in which an electric motor 31 is mounted, coaxially with the longitudinal axis of the rocket motor 1. The motor 31 is of known type, having the hollow armature shaft 32 which extends beyond the motor at the side adjacent to the rod 28, as shown at 33. A hollow cylindrical nut 34 is made fast to the extension 33 of the armature shaft, and has an end portion 35 extending beyond the hollow shaft of very slightly reduced internal diameter with respect to that portion which encompasses the extension 33. The end portion 35 of the nut is internally threaded.

The rod 28 has a smooth polygonal portion 36 at its end adjacent to the extrusion plate, which smooth portion freely fits into a socket 37 of interiorly complementary shape, fixed to the downstream face of the extrusion plate. The rotary movement of the rod is thus inhibited. Throughout the rest of its length the rod is threaded as indicated at 38. The rod is of such length that when the extrusion plate is in its rearwardmost position with one end of the rod against the closed end of the stem, the other end of the rod will be within the end portion 35 of the nut 34 and in free threaded engagement with said end portion. Obviously when the motor armature rotates, the rod being non-rotatable reciprocates. In one direction it moves upstream relative to the extruding propellant and is continuously contacted by the extrusion plate which, in that phase of movement of the rod, is on its extrusion stroke, impelled by combustion pressure in the combustion chamber.

A limit switch 39, mounted on the payload in position to be contacted by the extrusion plate, stops the motor while the end of the threaded portion of the rod 38 is still engaged with the threads of the nut 34. In this position, the greater part of the rod has been projected through the armature shaft and extends freely through a coaxial longitudinal passage 40, provided in the payload. A nose cone 41 is shown closing the front end of the passage.

The rod 28 is a free fit through the nut and armature shaft, no packing being employed. Vent 43 opening into stem 9 and communicating with the atmosphere through the side of the rocket, provides for ambient atmospheric pressure within the stem so that extrusion plate 6 functions as a differential piston, with the rate of upstream movement of rod 28 controlling the rate of motion of the differential piston and, thereby, the rate of propellant extrusion. It is contemplated that the motor 31 shall be of the variable speed type having brake means for bringing the rotation of its armature to an immediate stop when deenergized. The motor is controlled by the regulator 42, which responds to stimuli from the sensing element 27, as in the previously described modification.

An alternate regulating system can be based upon the principle of maintaining a desired acceleration of the rocket, say, 5 g's. In this case the regulator would be governed by an accelerometer instead of being responsive to the pressure in the combustion chamber. When the acceleration exceeds 5 g's, the variable valve would close partially, responsive to the position of the inertia element of the accelerometer, and when it drops below 5 g's, the valve would open partially, the rates of opening and closing being suitably related to the extent of departure from the desired acceleration, so as to prevent overshooting.

Yet again, one can regulate on the basis of a desired volumetric rate of propellant consumption. Here the sensing element could be a flow meter measuring the rate of efflux of the liquid from the stem 9, or equivalent chamber. When this is greater or less than desired, corresponding stimuli from the sensing device would correct the valve position.

One of the more important functions of the invention results from the fact that the pressurizing instrumentality which produces extrusion of the monopropellant is the extrusion plate itself. This is in marked contrast to known extrusion apparatus in which the pressure means is a piston at the opposite end of the mass from the extrusion plate so that the entire mass is moved by the pressure means toward the extrusion plate orifices. When the entire plastic mass is thus moved, its flow rate progressively decreases from its axial center to its periphery, apparently because of functional forces which slow down the material flowing in contact with the walls of the tank. The more slowly moving outer layer in turn slows down the next interior layer to a lesser extent. This produces unequal rates of extrusion of the propellant through the orifices of the extrusion plate when the orifices are of the same size and shape, the flow rate being higher through those orifices which are near the center of the extrusion plate than through the orifices toward the periphery of the extrusion member.

This differential in flow rate impairs the efficiency of operation of the burner or gas generator being fed. The minimum flow rate through every one of the apertures of the extrusion plate must be at least equal to and preferably higher than the linear burning rate of the monopropellant in order to maintain the process of combustion within the combustion chamber and prevent burning back into the fuel chamber. The minimum rate of extrusion must, therefore, be geared to that of the propellant venting into the combustion chamber through peripheral apertures in the extrusion member. Since the centrally positioned advancing columns of propellant will be extruding at a higher rate than the peripheral columns, the latter will be considerably shorter in length, than the former. This reduces the total mass burning surface area, and, thereby the mass rate of gas generation, as compared with that obtainable if the peripheral columns were extruding at the same linear rate as the more centrally positioned columns.

This untoward condition can be obviated by properly proportioning the cross-sectional area and length of the several series of passages according to their relative distances from the center of the extrusion plate, in order to obtain extrusion at the same rate, but this requires painstaking calculation and predesigning.

The present invention avoids altogether the problem arising from differences in the rates of extrusion by applying the extruding pressure directly to the end of the mass from which the extrusion emanates, at the same time bringing the orifices adjacent to the zone of displacement within the mass, so that the movement of the mass is substantially confined to a narrow zone adjacent to the extrusion plate, the rest of the mass remaining static although stressed. Since there is no movement between the bulk of the mass and the shell, frictional drag is eliminated.

The extrusion plate is preferably made of a material of low thermal conductivity, the maximum thermal conductivity preferably being about 3 B.t.u./hour/sq. ft./° F./ft. The low thermal conductivity of the extrusion member prevents conduction of heat from the combustion chamber along the walls of the orifice passages through which the propellant extrudes, so that the propellant in contact with the walls within the extrusion orifice is not heated to ignition temperature. Examples of suitable materials of low thermal conductivity include many refractory and ceramic compositions, such as aluminum and other silicates, fireclays, alundum, magnesite, sillimanite, silica, quartz and zirconia.

A low thermal conductivity material which gasifies under the conditions of elevated temperature developed in the combustion chamber is particularly desirable as a means for preventing burn-back of the extruding propellant. Gasification of the extrusion member material, either by decomposition or by change of state from a solid to a gas, or from a solid to a liquid and then to a gas, requires a substantial amount of heat energy. The requisite heat is absorbed from the hot combustion gases adjacent to the face of the extrusion member exposed in the combustion chamber, and the hot gases are thus cooled. The gases evolved by volatilization of the extrusion member material are relatively cool and, upon admixture with the already cooled gases adjacent to an extrusion orifice, reduce the temperature of the gases in contact with that portion of the extruding mass of propellant adjacent to the rim of the orifice at the point of entry of the propellant into the combustion chamber, thereby tending to quench peripheral burning of the advancing propellant mass at the orifice and preventing any burn-back along the walls of the orifice passage that might otherwise take place. Most effective quenching is obtained with extrusion member materials which volatilize at temperatures below or not substantially higher than the ignition temperature of the monopropellant.

Substantially any organic compound volatilizes or decomposes to form gases at the high temperature developed by burning of the monopropellant in the combustion chamber, so that any such compound having the desired low thermal conductivity can be employed. Many organic polymers are particularly suitable as structural materials including, for example, polyamides, such as nylon; acrylic and methacrylic resins, such as polymethyl methacrylate; cellulose esters, such as cellulose acetate; cellulose ethers, such as ethyl cellulose; polyesters, such as the alkyd resin; vinyl polymers, such as polystyrene and polyvinyl chloride; fluorohydrocarbons, such as polytetrafluoroethylene (Teflon); polyurethanes; phenolaldehydes; phenol-ureas; silicones; and the like.

Finely-divided solid organic compounds and inorganic compounds having good gasifying properties can be dispersed in the basic structural material, which can be a different gasifying material, such as an organic polymer or a mixture of such a gasifying material with a refractory non-gasifying material. Examples of organic gasifying compounds suitable for such dispersion include such compounds as oxamide, melamine, anthraquinone, p-benzoyl aminobenzoic acid, and a multitude of others. Examples of just a few of the many available gasifying inorganic compounds are calcium, sodium, and ammonium phosphate, carbonate and bicarbonate salts, ammonium chloride, antimony oxychloride, etc.

The extrusion plate material can also be a mixture of a non-gasifying refractory material, in felted or woven form, or in flake or fiber form, such as asbestos, fiberglass, mica and the like, and a gasifying material, such as a solid organic polymer. Upon gasification of the organic polymer, the non-gasifying component remains as a rigid structure of low thermal conductivity, which preserves the original contours of the extrusion plate.

The monopropellant employed in the device of this invention, as aforementioned, is preferably a plastic mass which is sufficiently cohesive to retain a shaped form and which is extrudable under pressure at ambient temperatures. Many different plastic monopropellant compositions tailored to different performance requirements can be made having these desired physical characteristics. The monopropellant compositions can be a double-base type propellant, such as nitroglycerine gelled with nitrocellulose. Generally, it will comprise a stable dispersion of a finely-divided, insoluble solid oxidizer in a continuous matrix of an oxidizable liquid fuel.

The liquid fuel can be any oxidizable liquid, preferably an organic liquid containing carbon and hydrogen. Suitable liquid fuels include hydrocarbons, such as triethyl benzene, dodecane, liquid polyisobutylene, and the like, compounds containing oxygen linked to a carbon atom, as, for example, esters, like dimethyl maleate, diethyl phthalate, dibutyl oxalate, and the like; alcohols, such as benzyl alcohol, triethylene glycol and the like; ethers such as methyl α-naphthyl ether and the like; and many others.

The solid oxidizer can be any suitable, active oxidizing agent which yields an oxidizing element such as oxygen, chlorine or fluorine readily for combustion of the fuel and which is insoluble in the liquid fuel vehicle. Such oxidizers include inorganic oxidizing salts such as ammonium, sodium and potassium perchlorate or nitrate and metal peroxides such as barium peroxide. The amount of solid oxidizer incorporated varies, of course, with the particular kind and concentration of fuel components in the formulation, the particular oxidizer, and the specific requirements for a given use, in terms, for example, of required heat release and rate of gas generation, and can readily be computed by those skilled in the art. Since the liquid vehicle can, in many instances, be loaded with as high as 80 to 90% of finely-divided solids, stoichiometric oxidizer levels with respect to the fuel components can generally be achieved when desired, as for example, in rocket applications where maximum heat release and specific impulse are of prime importance. In some applications, stoichiometric oxidation levels may not be necessary or even desirable, as, for example, in gas turbines where relatively low combustion chamber temperatures are preferred, and the amount of oxidizer can be correspondingly reduced. Sufficient oxidizer must, of course, be incorporated to maintain active, gas-generating combustion.

Finely-divided solid metal powders such as aluminum or magnesium, may be incorporated in the monopropellant composition as an additional fuel component along with the liquid fuel. Such metal powders possess the advantages both of increasing the fuel density and improving the specific impulse of the monopropellant because of their high heats of combustion.

The physical properties of the plastic monopropellant in terms of shape-retentive cohesiveness, tensile strength and thixotropy, can be improved by addition of a gelling agent, such as a polymer, e.g. polyvinyl chloride, polyvinyl acetate, cellulose acetate, ethyl cellulose or metal salts of higher fatty acids, such as the sodium or magnesium stearates or palmitates. The desired physical properties can also be obtained without a gelling agent by using a liquid vehicle of substantial intrinsic viscosity, such as liquid organic polymers, e.g. liquid polyisobutylene, liquid siloxanes, liquid polyesters, and the like.

Many other plastic monopropellant compositions can also be used. It is, therefore, to be understood that this invention is not limited to use with any particular plastic monopropellant composition, but rather is directed to an apparatus particularly adapted for extruding any plastic monopropellant into a fuel chamber.

While I have in the above description disclosed practical embodiments of the invention, it is to be understood that the invention consists primarily in the inventive concept which is common to these forms and that it may be embodied in other constructions such as may be within the scope of the appended claims.

I claim:

1. Apparatus for generating gases by the combustion of a plastic, extrudable monopropellant, comprising a tubular shell having fixed, spaced, end-wall forming means and a transverse extrusion plate slidably fitting said shell dividing it into a storage chamber for monopropellant, and a combustion chamber, said extrusion plate being made of a non-metallic material having a maximum thermal conductivity of about 3 B.t.u./hour/sq. ft./° F./ft. and being formed with a pattern of extrusion orifices therethrough communicating with said chambers, means within said storage chamber for limiting the area of that part of the upstream face of said extrusion plate which is exposed to contact with a mass of monopropellant filling said storage chamber, to less than the area of the face exposed to said combustion chamber, means for maintaining less than combustion chamber pressure on that part of said upstream face not exposed to contact with the monopropellant mass, whereby the resulting pressure differential biases said extrusion plate to move through the mass of monopropellant in said storage chamber and to force its extrusion through the orifices.

2. Apparatus for generating gases by the combustion of a plastic, extrudable monopropellant, comprising a tubular shell having fixed, spaced, end-wall forming means, and a transverse extrusion plate slidably fitting said shell between said means dividing it into a storage chamber for monopropellant, and a combustion chamber, said extrusion plate being formed with a pattern of extrusion orifices therethrough communicating with said chambers, a tubular stem extending from said extrusion plate longitudinally through said storage chamber and contacting said extrusion plate in such manner as to exclude the contacted area of said plate from the area exposed to contact with a mass of monopropellant filling said storage chamber, incompressible means within said stem, means for withdrawing said incompressible means from said stem at a controlled rate, in a manner whereby the pressure on the area of the plate contacted by said stem is maintained at a controlled pressure less than combustion chamber pressure, the resulting pressure differential biasing said plate to move through said monopropellant mass and to force its extrusion through the orifices at a controlled rate determined by the rate of withdrawal of said incompressible member.

3. The apparatus of claim 2 in which the incompressible means is a mobile liquid.

4. The apparatus of claim 3 in which the tubular stem is axially collapsible.

5. The apparatus of claim 2 in which the incompressible means is a rigid rod.

6. Apparatus for generating gases by the combustion of a plastic, extrudable monopropellant, comprising a tubular shell having fixed, spaced, end-wall forming means, and a transverse extrusion plate slidably fitting said shell between said means dividing it into a storage chamber for monopropellant, and a combustion chamber, said extrusion plate being formed with a pattern of extrusion orifices therethrough communicating with said chambers, a tubular stem extending from said extrusion plate longitudinally through said storage chamber contacting said extrusion plate in such manner as to exclude the contacted area of said plate from the area exposed to contact with a mass of monopropellant filling said storage chamber, incompressible means within said stem, means for withdrawing said incompressible means at a controlled rate, whereby the pressure on the area of the plate contacted by said stem is maintained at less than combustion chamber pressure, the resulting pressure differential biasing said plate to move through said monopropellant mass and to force its extrusion through the orifices at a rate determined by the rate of withdrawal of said incompressible member, a combustion chamber pressure sensing means in said combustion chamber, and regulating means responsive to stimuli communicated thereto by said sensing means for withdrawing said incompressible means at a rate responsive to variation in the combustion chamber pressure.

7. Apparatus for generating gases by combustion of a plastic, extrudable monopropellant, comprising a tubular shell having fixed, spaced, end-wall forming means, and a transverse extrusion plate slidably fitting said shell dividing it into a storage chamber to be filled with a mass of plastic monopropellant, and a combustion chamber, said extrusion plate having a plurality of extrusion orifices therethrough communicating with said chambers, an axially collapsible tubular stem extending through said storage chamber having one end fixed to the adjacent face of said extrusion plate in such manner as to limit that part of said adjacent face which is exposed to contact with said mass of monopropellant to less than the area of the face of said plate adjacent to said combustion chamber, an incompressible mobile liquid column filling said stem and normally confined therein, means for withdrawing the liquid of said column at a controlled rate whereby the pressure on that part of the area of said face contacted by said stem is maintained at less than combustion chamber pressure, the resulting pressure differential biasing said plate to move through said monopropellant mass and to force its extrusion through the orifices at a rate determined by the rate of withdrawal of said incompressible liquid, said liquid-withdrawing means including sensing means in said combustion chamber responsive to combustion chamber pressure, an adjustable valve controlling depletion of the liquid in said stem, connected to a discharge passage, and a regulator, responsive to the combustion chamber pressure induced stimuli communicated by said sensing device, for operating said valve to vary the rate of discharge of liquid through said valve responsive to variations in the combustion chamber pressure.

8. Apparatus for generating gases as claimed in claim 7, said stem being formed of telescopic sections.

9. Apparatus for generating gases by the combustion of a plastic, extrudable monopropellant, comprising a tubular shell having fixed, spaced, end-wall forming means, and a transverse extrusion plate slidably fitting said shell dividing it into a storage chamber to be filled with a mass of plastic monopropellant, and a combustion chamber, said extrusion plate having a plurality of extrusion orifices therethrough communicating with said chambers, an axially collapsible tubular stem extending through said storage chamber having one end so secured to the adjacent face of said extrusion plate as to limit the area of that part of said face which is exposed to contact with said mass of monopropellant to less than the area of the opposite face, a column of incompressible liquid filling said stem and normally confined therein, means for withdrawing the liquid of said column at a controlled rate whereby the pressure on that part of the area of said face contacted by said stem is maintained at less than combustion chamber pressure, the resulting pressure differential biasing said plate to move through said monopropellant mass and to force its extrusion through the orifices at a rate determined by the rate of withdrawal of said incompressible liquid, said liquid-withdrawing means including a valve controlling depletion of the liquid in said stem connected to a discharge passage, an igniter in said combustion chamber, means in circuit with said igniter for holding said valve closed, constructed to release said valve upon the activation of said igniter, a sensing device in said combustion chamber, and a regulator operative responsive to stimuli transmitted thereto from said sensing device corresponding to variations in combustion chamber pressure for adjustably moving said valve in an opening and closing direction, thereby varying the rate of discharge of liquid through said valve responsive to variations in combustion chamber pressure.

10. Apparatus as claimed in claim 1, said extrusion plate being capable of producing gases when heated by the hot combustion chamber gases in the combustion chamber.

11. In apparatus for generating gases by the combustion of a plastic extrudable monopropellant, a tubular shell having fixed, spaced, end-wall forming means, and a transverse extrusion plate slidably fitting said shell dividing it into a storage chamber to be filled with a mass of plastic monopropellant, and a combustion chamber, said extrusion plate being provided with a plurality of extrusion orifices communicating with said chambers, means for creating an imbalance between the combustion pressure on the combustion chamber side of said extrusion plate and the reaction pressure on the storage chamber side, the resulting pressure differential biasing said extrusion plate to move through the mass of monopropellant in said storage chamber, and to force its extrusion through said orifices, and means operative responsive to combustion chamber pressure to vary the rate of extrusion in inverse rate to said pressure.

12. Apparatus for generating gases by combustion of a plastic, extrudable monopropellant, comprising a tubular shell having fixed, spaced, end-wall forming means, and a transverse extrusion plate slidably fitting said shell dividing it into a storage chamber to be filled with a mass of plastic monopropellant, and a combustion chamber, said extrusion plate having a plurality of extrusion orifices therethrough communicating with said chambers, an axially collapsible tubular stem extending through said storage chamber having one end fixed to the upstream face of said extrusion plate in such manner as to limit that part of the upstream face exposed to contact with said propellant mass to an area less than the area of the face adjacent to the combustion chamber, a rigid rod extending longitudinally through said stem having one end against the upstream face of said extrusion plate, and means for withdrawing said rod at a controlled rate, whereby the pressure on the area of the plate excluded by said stem from the monopropellant storage chamber is maintained at less than combustion chamber pressure, the resulting pressure differential biasing said plate to move through said monopropellant mass and to force its extrusion through the orifices at a rate determined by the rate of withdrawal of said rod.

13. Apparatus for generating gases as claimed in claim 12, in which the means for withdrawing said rod is responsive to combustion chamber pressure through stimuli communicated to it by sensing means in said combustion chamber, whereby the rate of withdrawal is responsive to said combustion chamber pressure.

14. Apparatus for generating gases by combustion of a plastic, extrudable monopropellant, comprising a tubular shell having fixed, spaced, end-wall forming means, and a transverse extrusion plate slidably fitting said shell dividing it into a storage chamber to be filled with a mass of plastic monopropellant, and a combustion chamber, said extrusion plate having a plurality of extrusion orifices therethrough communicating with said chambers, an axially collapsible tubular stem extending through said storage chamber having one end fixed to the upstream face of said extrusion plate in such manner as to limit that part of the upstream face exposed to contact with said monopropellant mass to an area less than the area of the face adjacent to the combustion chamber, a rigid rod extending longitudinally through said stem having one end against the upstream face of said extrusion plate, said rod being reciprocally and non-rotatably mounted and having an externally threaded portion, a rotatable nut non-reciprocally mounted and having threads engaging the threaded portion of said rod, and means for withdrawing said rod at a controlled rate whereby the pressure on the area of the plate excluded by said stem from the monopropellant storage chamber is maintained at less than combustion chamber pressure, the resulting pressure differential biasing said plate to move through said monopropellant mass and to force its extrusion through the orifices at a rate determined by the rate of withdrawal of said rod, said withdrawing means comprising motor means for rotating said nut, said motor means being constructed to operate responsive to combustion chamber pressure through stimuli communicated to it by sensing means in said combustion chamber, whereby the rate of withdrawal is responsive to said combustion chamber pressure.

15. Apparatus for generating gases by combustion of a plastic, extrudable monopropellant, comprising a tubular shell having fixed, spaced, end-wall forming means, and a transverse extrusion plate slidably fitting said shell dividing it into a storage chamber to be filled with a mass of plastic monopropellant, and a combustion chamber, said extrusion plate having a plurality of extrusion orifices therethrough communicating with said chambers, an axially collapsible tubular stem extending through said storage chamber having one end fixed to the upstream face of said extrusion plate in such manner as to limit that part of the upstream face exposed to contact with said monopropellant mass to an area less than the area of the face adjacent to the combustion chamber, a rigid rod extending axially through said stem having one end against the upstream face of said extrusion plate, the end portion being non-round and freely fitting non-rotatably into a socket fixed with respect to said extrusion plate, said rod having an externally threaded portion, and means for withdrawing said rod at a controlled rate, whereby the pressure on the area of the plate excluded by said stem from the monopropellant storage chamber is maintained at less than combustion chamber pressure, the resulting pressure differential biasing said plate to move through said monopropellant mass and to force its extrusion through the orifices at a rate determined by the rate of withdrawal of said rod, said withdrawing means comprising a motor fixedly mounted adjacent to the opposite end of said rod and having a tubular rotor shaft in axial alignment with said rod through which said rod freely passes, a nut fixed to the end of said rotor shaft adjacent to said rod, to rotate with said shaft, said nut permanently engaging the threaded portion of said rod whereby upon rotation of said nut the rod reciprocates, said motor including regulating means for causing it to operate responsive to combustion chamber pressure through stimuli communicated to it by sensing means in the combustion chamber, so that the rate of withdrawal of said rod is responsive to the combustion chamber pressure.

16. Apparatus as claimed in claim 2, said extrusion plate being made of a material of low thermal conductivity.

17. Apparatus as claimed in claim 16, said extrusion plate being capable of producing gases when heated by the hot combustion gases in the combustion chamber.

References Cited in the file of this patent

UNITED STATES PATENTS

| 2,700,337 | Cumming | Jan. 25, 1955 |
| 2,703,960 | Prentiss | Mar. 15, 1955 |
| 2,868,127 | Fox | Jan. 13, 1959 |

FOREIGN PATENTS

| 582,621 | Great Britain | Nov. 22, 1946 |
| 695,048 | Great Britain | Aug. 5, 1953 |
| 701,117 | Great Britain | Dec. 16, 1953 |